United States Patent
Sung et al.

(10) Patent No.: US 8,391,014 B2
(45) Date of Patent: Mar. 5, 2013

(54) EXPANDABLE COMPUTER SYSTEM AND FASTENING DEVICE THEREOF

(75) Inventors: Chen-Han Sung, Taipei (TW); Tsung-Cheng Lin, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 419 days.

(21) Appl. No.: 12/899,520

(22) Filed: Oct. 6, 2010

(65) Prior Publication Data
US 2011/0104950 A1    May 5, 2011

(30) Foreign Application Priority Data
Oct. 29, 2009    (TW) ................................ 98136624 A

(51) Int. Cl.
*H05K 5/00*    (2006.01)
(52) U.S. Cl. .................... 361/759; 361/212; 361/679.32; 361/679.33; 361/679.4; 361/679.41; 361/737
(58) Field of Classification Search .................. 361/759, 361/212, 679.32, 679.33, 679.37, 679.4, 361/679, 41, 679.43, 679.56, 679.57, 715, 361/725, 737; 439/79, 181, 405, 497, 535, 439/541.5, 564, 620.22, 637, 638, 722; 312/183; 710/2, 33, 300, 303, 304, 305; 713/300, 713/323; 320/113, 128
See application file for complete search history.

(56) References Cited

U.S. PATENT DOCUMENTS

| | | | | |
|---|---|---|---|---|
| 5,153,817 A * | 10/1992 | Hosoi et al. | ............... | 361/679.37 |
| 5,159,533 A * | 10/1992 | Kuang | ..................... | 361/679.43 |
| 5,434,743 A * | 7/1995 | Hosoya et al. | ........... | 361/679.32 |
| 5,596,728 A * | 1/1997 | Belmont | ....................... | 710/304 |
| 5,627,727 A | 5/1997 | Aguilera | | |
| 5,911,079 A * | 6/1999 | Yang et al. | ..................... | 713/300 |
| 5,949,644 A * | 9/1999 | Park | ......................... | 361/679.32 |
| 5,982,141 A * | 11/1999 | Hinohara | ...................... | 320/113 |
| 5,991,839 A * | 11/1999 | Ninomiya | ..................... | 710/303 |
| 6,119,237 A * | 9/2000 | Cho | ............................. | 713/300 |
| 6,605,924 B2 * | 8/2003 | Tanaka et al. | ................. | 320/113 |
| 6,704,808 B2 * | 3/2004 | Kasamatsu et al. | .............. | 710/2 |
| 6,742,070 B2 * | 5/2004 | Fuchida | ....................... | 710/303 |
| 6,917,989 B1 * | 7/2005 | Inoue | ............................... | 710/2 |
| 7,386,868 B2 | 6/2008 | McCormack | | |
| 2002/0008497 A1 * | 1/2002 | Tanaka et al. | ................. | 320/128 |
| 2002/0181054 A1 * | 12/2002 | Kaji | ............................. | 359/154 |

(Continued)

FOREIGN PATENT DOCUMENTS

| CN | 2133015 Y | 5/1993 |
|---|---|---|
| CN | 201319596 Y | 9/2009 |

(Continued)

*Primary Examiner* — Xiaoliang Chen
(74) *Attorney, Agent, or Firm* — Winston Hsu; Scott Margo

(57) ABSTRACT

An expandable computer system and a fastening device are disclosed in this invention. The expandable computer system includes a computer, an expansion device and a rigid component. The expansion device includes a first holding portion disposed at a first side of the expansion device, and a first interface socket disposed at a second side of the expansion device. The computer includes a second holding portion and a second interface socket. The rigid component has two transmission plugs and a transmission circuit. The two transmission plugs are coupled with two terminals of the transmission circuit. When the first holding portion is connected with the second holding portion, the two transmission plugs are detachably connected with the first interface socket and the second interface socket to fasten the expansion device to the computer.

21 Claims, 4 Drawing Sheets

U.S. PATENT DOCUMENTS

| | | | |
|---|---|---|---|
| 2003/0067744 A1* | 4/2003 | Pappalardo et al. | 361/686 |
| 2003/0211784 A1* | 11/2003 | Wu et al. | 439/638 |
| 2004/0043657 A1* | 3/2004 | Helot et al. | 439/535 |
| 2004/0148449 A1* | 7/2004 | Chang | 710/305 |
| 2005/0101184 A1* | 5/2005 | Chang et al. | 439/564 |
| 2005/0243503 A1* | 11/2005 | Robertson et al. | 361/683 |
| 2006/0190652 A1* | 8/2006 | Keely et al. | 710/303 |
| 2007/0294452 A1* | 12/2007 | Chiu et al. | 710/300 |
| 2008/0188125 A1* | 8/2008 | Horiuchi et al. | 439/607 |
| 2009/0027849 A1* | 1/2009 | Tanaka | 361/686 |
| 2009/0190297 A1* | 7/2009 | Feldman et al. | 361/679.32 |

FOREIGN PATENT DOCUMENTS

| | | |
|---|---|---|
| TW | 559313 | 10/2003 |
| TW | M345281 | 11/2008 |
| TW | M345286 | 11/2008 |

\* cited by examiner

EXPANDABLE COMPUTER SYSTEM AND FASTENING DEVICE THEREOF

CROSS-REFERENCE TO RELATED APPLICATIONS

This Non-provisional application claims priority under 35 U.S.C. §119(a) on Patent Application No(s). 098136624 filed in Taiwan, Republic of China Oct. 29, 2009, the entire contents of which are hereby incorporated by reference.

BACKGROUND OF THE INVENTION

1. Field of the Invention

This invention relates to an expandable computer system and, more particularly, to an expandable computer system and a fastening device for different assemblies of the expandable computer system.

2. Description of the Related Art

In recent years, with rapid development of consumed electronic products, different kinds of computer systems, such as a mobile phone, a personal digital assistant (PDA), a global positioning system (GPS), a notebook computer, a netbook and so on, with light volume and powerful functions are gradually populated. Recently, electronic manufactures bring out a mini desktop nettop computer between a notebook computer and a desktop computer to satisfy tendency of digital home. The main characteristic of the mini computer is that the computer has light weight and small volume. Therefore, the computer can be conveniently disposed anywhere at home, and the computer can even be hanged at a back cover of a liquid crystal television.

With development of present technology, a whole thickness of a mini computer can be reduced to be less than 2 cm, and the size of the mini computer is equal to that of a book. To simplify the structure, the necessary and kernel components, such as a central processing unit, a power module, an interface circuit, a network communication module, a storage media (such as a flash memory module), a signal processing module and so on, will remain in the mini computer, and the components, such as a hard disk drive, an optical disk drive, a graphic card socket and so on, with large volume and failing to reduce occupied space are omitted.

However, if only the components built in the mini computer are limit, the application range is also limited. For example, the mini computer lacks a storage media with large capacity. Further, a multimedia optical disk (such as a VCD, a DVD, a blue-ray disk and so on) may fail to be played, and the graphic processing ability thereof may be insufficient due to lack of an independent graphic card.

BRIEF SUMMARY OF THE INVENTION

This invention provides an expandable computer system and a fastening device for different assemblies of the expandable computer system. A computer in the invention is different from products in the present market. The computer in the invention can be conveniently disposed, and different kinds of expansion devices can be conveniently and stably fastened to the computer via the fastening device in the invention to achieve variety application functions and improve the prior art.

One scope of the invention is to provide an expandable computer system.

The expandable computer system in the invention includes a computer, an expansion device, and a rigid component. The expansion device includes a first holding portion and a first interface socket. The first holding portion is disposed at a first side of the expansion device, and the first interface socket is disposed at a second side of the expansion device. The computer includes a second holding portion and a second interface socket. The rigid component has two transmission plugs, and a transmission circuit is embedded in the rigid component. The two transmission plugs are coupled with two terminals of the transmission circuit, respectively.

When the first holding portion is connected with the second holding portion, the two transmission plugs of the rigid component are detachably connected with the first interface socket of the expansion device and the second interface socket of the computer, respectively, thereby fastening the expansion device to the computer.

Another scope of the invention is to provide a fastening device for fastening an expansion device to a computer.

The fastening device in the invention includes a holding assembly and a rigid component. The holding assembly includes a first holding portion and a second holding portion. The first holding portion is disposed at a first side of the expansion device, and the second holding portion is disposed at the computer. The rigid component has two transmission plugs, and a transmission circuit is embedded in the rigid component. The two transmission plugs are coupled with two terminals of the transmission circuit, respectively.

When the first holding portion is connected with the second holding portion, the two transmission plugs of the rigid component are detachably connected with the first interface socket of the expansion device and the second interface socket of the computer, respectively, thereby fastening the expansion device to the computer.

Compared with the conventional computer system, different kinds of expansion devices (such as a storage media with large capacity, an optical disk recorder, a blue-ray disk drive, a high definition wireless media player and so on) can be conveniently and stably fastened to the computer according to the expandable computer system in the invention. The rigid component can be used for clipping and fastening the expansion device and can also be used as a channel for supplying power and exchanging information between the expansion device and the computer, thus to allow the expandable computer system to use the expansion device to achieve different advanced applications.

These and other features, aspects, and advantages of the present invention will become better understood with regard to the following description, appended claims, and accompanying drawings.

DETAILED DESCRIPTION OF THE INVENTION

Figure 1A:
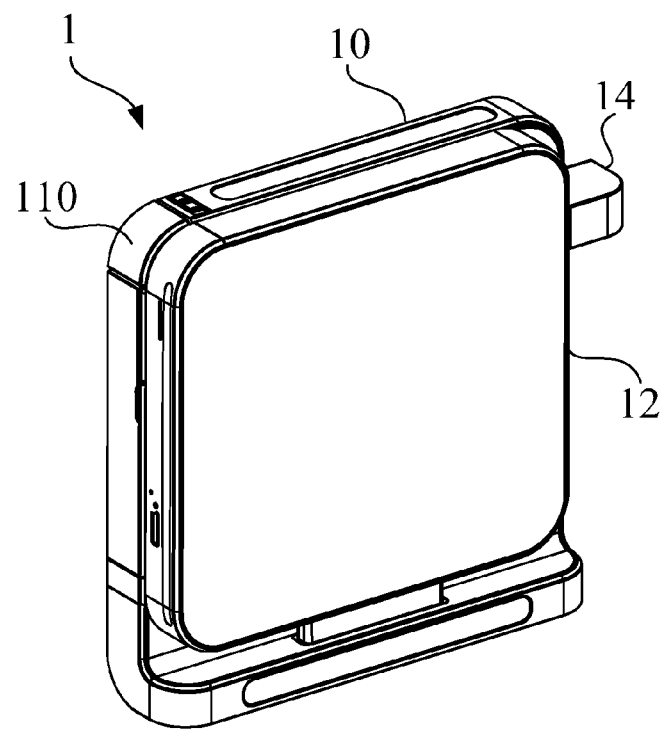
FIG. 1A is a schematic diagram showing an expandable computer system according to one embodiment of the invention.
Figure 1B:
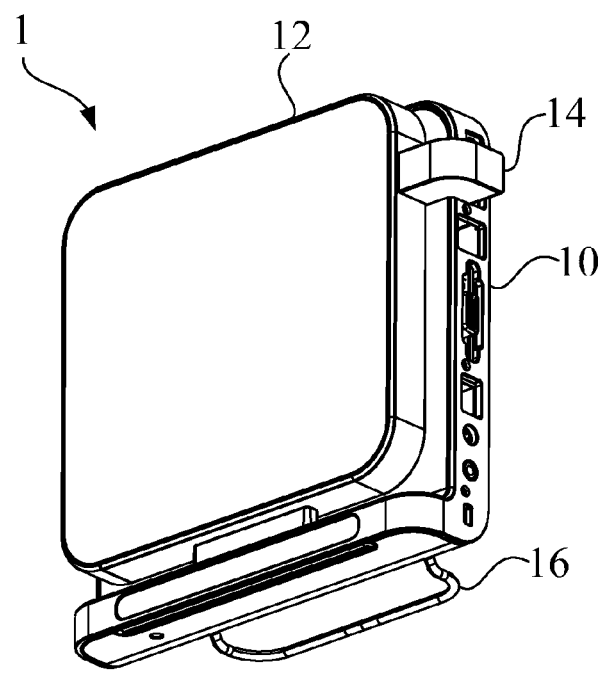
FIG. 1B is a schematic diagram showing an expandable computer system from another viewing angle according to one embodiment of the invention.

FIG. 1A is a schematic diagram showing an expandable computer system 1 according to one embodiment of the invention. FIG. 1B is a schematic diagram showing the expandable computer system 1 from another viewing angle according to one embodiment of the invention. In FIG. 1A, in the embodiment of the invention, the expandable computer system 1 can include a computer 10 and an expansion device 12.

In the embodiment, the computer 10 can be a mini desktop nettop computer or other equal computer systems. The computer 10 include different kinds of elements needed by basic operation of the computer, such as a central processing unit, a power module, a network communication module, a storage media, a system memory, different kinds of input/output interface circuits and so on. However, the invention is not limited thereto. The internal elements of the computer 10 are known by persons having ordinary skill in the art. Therefore, they are not described for a concise purpose.

In the embodiment, the expansion device 12 can be a portable hard disk, a portable optical disk drive (such as a CD-ROM drive, a DVD-ROM drive, or a blue-ray disk drive), a multimedia player, or a wireless multimedia player (such as a high definition multimedia interface (HDMI) wireless player) and so on. That is, the expansion device 12 is a hardware assembly with a specific expansion function, and the expansion device 12 with different functions can be replaced at any time according to users' needs to cooperate with the computer 10. In FIG. 1A, the expansion device 12 may be a readable and writable optical disk drive, allowing the computer 10 to read or record an optical disk. Thus, the mini computer 10 can be free from volume limitation to achieve different advanced applications. For example, high definition multimedia information may be transmitted to a television or a computer screen for playing in a wireless transmission mode (via Wi-Fi or Bluetooth communications protocol).

In the embodiment, when the expansion device 12 (the readable and writable optical disk drive) cooperates with the computer 10, the expansion device 12 needs to be stably fastened to the computer 10, thereby preventing the optical disk drive (or other expansion devices) from generating abnormality or failure due to shaking or swaying during operation. In the embodiment of the invention, a fastening device for fastening the computer 10 and the expansion device 12 of the expandable computer system 1 is provided. The fastening device can include a holding assembly, a rigid component 14, and a latching assembly. The expandable computer system 1, the fastening device thereof, and the fastening mode in the embodiment of the invention are described hereinbelow in detail.

Figure 2A:
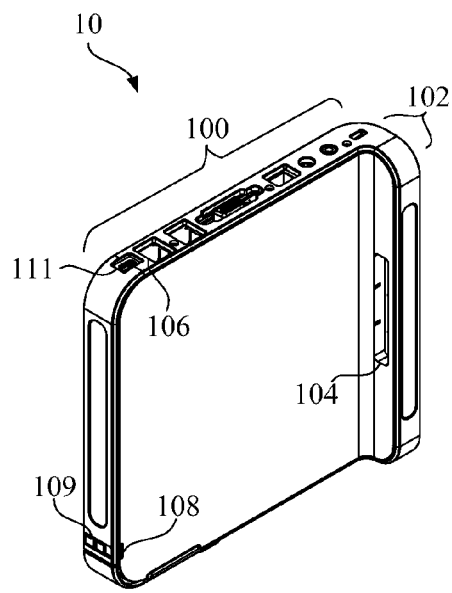
FIG. 2A is a schematic diagram showing a computer according to one embodiment of the invention.
Figure 2B:
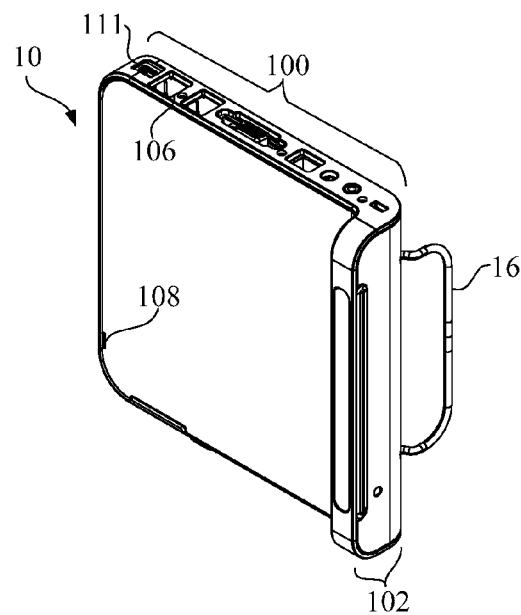
FIG. 2B is a schematic diagram showing a computer from another viewing angle according to one embodiment of the invention.
Figure 2C:
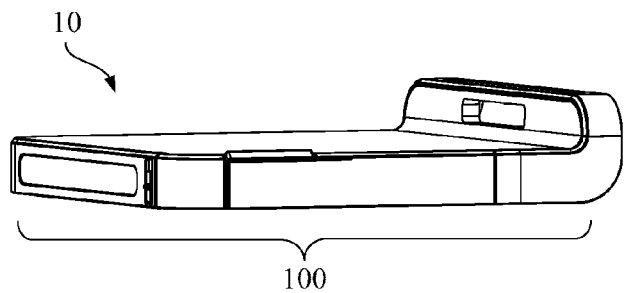
FIG. 2C is a schematic diagram showing a computer lying for use.
Figure 3:
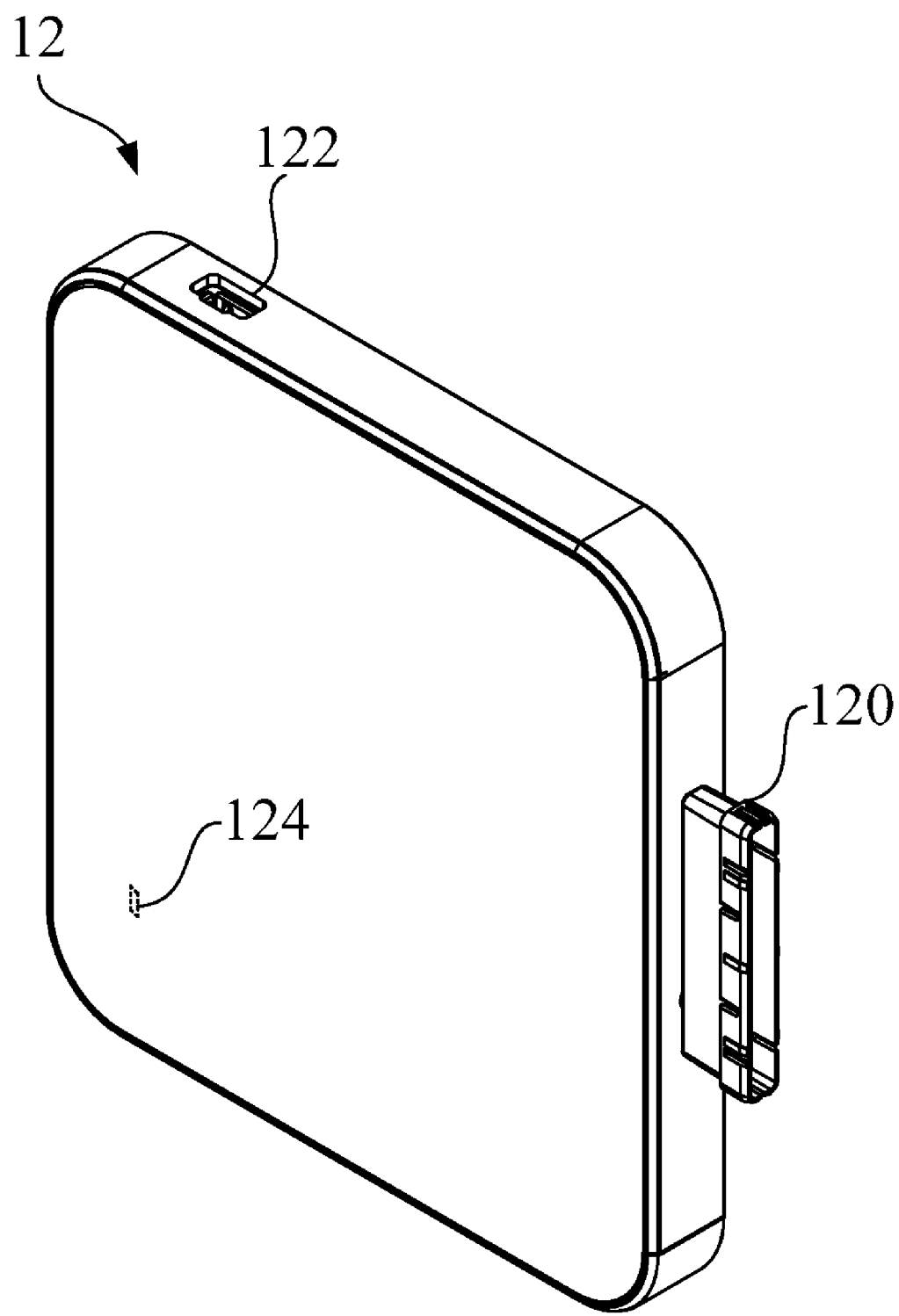
FIG. 3 is a schematic diagram showing an expansion device according to one embodiment of the invention.
Figure 4:
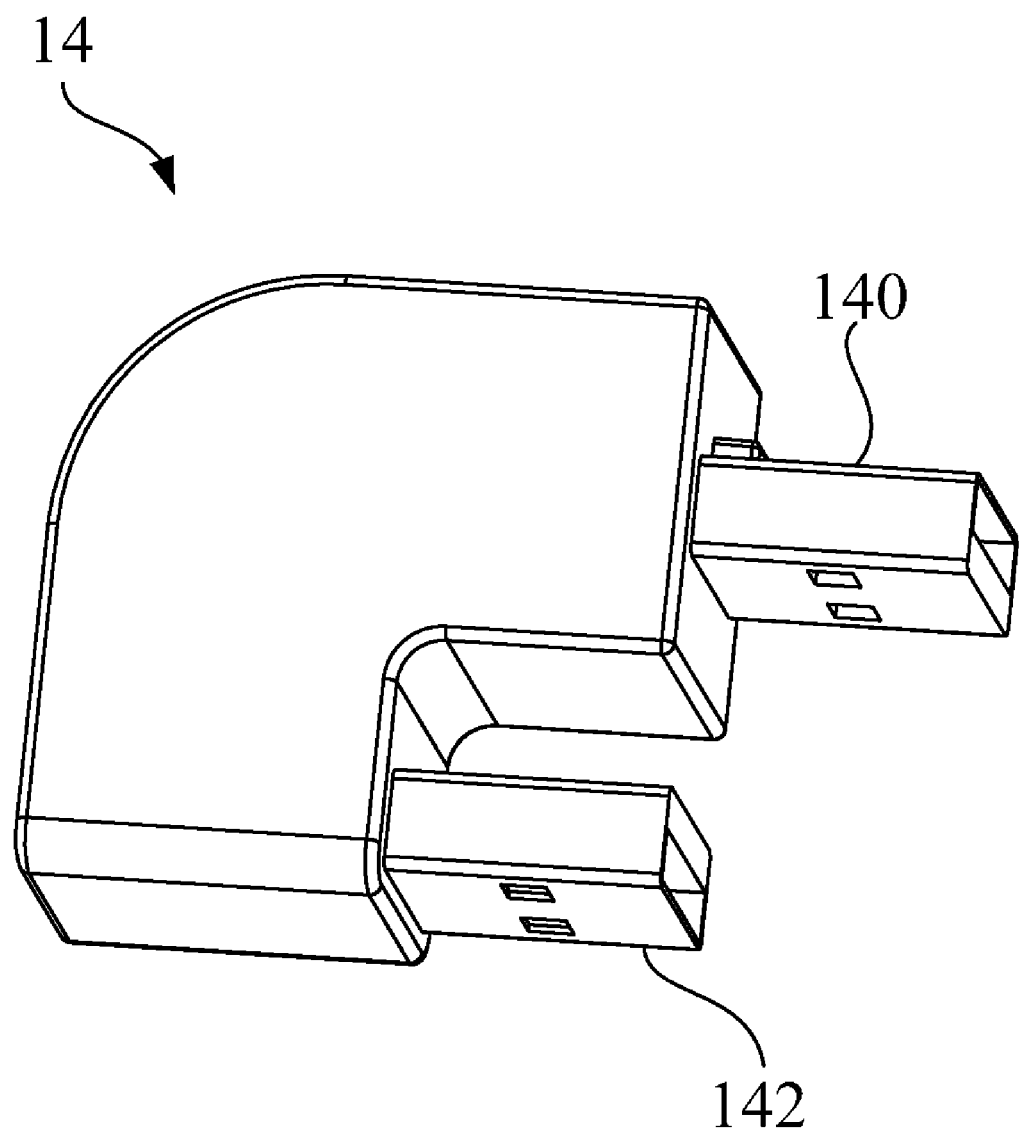
FIG. 4 is a schematic diagram showing a rigid component according to one embodiment of the invention.

Please refer to FIG. 2A, FIG. 2B, FIG. 2C, FIG. 3, and FIG. 4 together. FIG. 2A and FIG. 2B are schematic diagrams showing the computer 10 from different viewing angles according to one embodiment of the invention. FIG. 2C is a schematic diagram showing the computer 10 lying for use. FIG. 3 is a schematic diagram showing the expansion device 12 according to one embodiment of the invention. FIG. 4 is a schematic diagram showing the rigid component 14 according to one embodiment of the invention.

In FIG. 2A and FIG. 2B, in the embodiment, the computer 10 includes a main body portion 100 and an extending portion 102 according to the shape. The extending portion 102 is formed by extending and being bent from one end of the main body portion 100, and the main body portion 100 and the extending portion 102 substantially present an L-shaped structure. However, the invention is not limited to the L-shaped structure. The main body portion 100 and the extending portion 102 may also present a T-shaped structure or other shapes.

In addition, the computer 10 further comprises a second holding portion 104, a second interface socket 106, a second latching portion 108, and a latching switch 109. The second holding portion 104 is disposed at the extending portion 102, and the second interface socket 106, the second latching portion 108, and the latching switch 109 are disposed at the main body portion 100, respectively.

In the embodiment, the computer 10 can be erected or lie for use. In FIG. 1B, when the computer 10 is erected for use, the computer 10 is erected at a desk surface or any plane via the support of the extending portion 102. In addition, when the computer 10 is erected, the computer 10 can also cooperate with a stand 16, and the stand 16 can be used as a balance point to allow the computer 10 to be stably erected. In another aspect, when the computer 10 lies for use, the computer 10 can directly lie for use via the main body portion 100 as shown in FIG. 2C.

In one embodiment of the present invention, the extending portion 102 can further include a balancing weight element (not shown), and the balancing weight element can be made of a material with higher density for balancing weight distribution between the main body portion 100 and the extending portion 102. Thereby, erect stability of the computer 10 can be further improved when the computer 10 is erected.

In FIG. 2A, the second holding portion 104 is a recess in the embodiment. The second interface socket 106 is disposed at the main body portion 100. In the embodiment, the second interface socket 106 can be a universal serial bus (USB) socket.

On the other hand, the expansion device 12 includes a first holding portion 120, a first interface socket 122, and a first latching portion 124 as shown in FIG. 3. In FIG. 3, the first holding portion 120, the first interface socket 122, and the first latching portion 124 of the expansion device 12 are disposed at three side surfaces of the expansion device 12, respectively. The viewing angle in FIG. 3 is taken for example. The first holding portion 120 is disposed at a first side of the expansion device 12, i.e. a right side surface of the expansion device 12 in FIG. 3; the first interface socket 122 is disposed at a second side of the expansion device 12, i.e. a top surface of the expansion device 12 in FIG. 3; the first latching portion 124 is disposed at a third side of the expansion device 12, i.e. a back surface of the expansion device 12 in FIG. 3. However, the three side surfaces of the expansion device 12 are used for describing that the fastening device in the embodiment of the invention is used for fastening the expansion device 12 to the computer 10 in a three-point fastening mode. For example, the first latching portion 124 may be disposed at the third side of the expansion device 12, i.e. the back surface or a border between the back surface and a left surface of the expansion device 12 in FIG. 3. However, the invention is not limited thereto.

In FIG. 3, the first holding portion 120 can be a protrudent block, and the first holding portion 120 is detachably (such as in a screwed mode) disposed at a casing of the expansion device 12. In another embodiment, the first holding portion 120 may be integrally formed with a casing of the expansion device 12 directly.

The size, depth, disposition, and direction of the first holding portion 120 (the protrudent block) of the expansion device 12 correspond to that of the second holding portion 104 (the recess) of the computer 10. The first holding portion 120 of the expansion device 12 and the second holding portion 104 of the computer 10 are the holding assembly of the fastening device in the embodiment of the invention.

In FIG. 4, the rigid component 14 includes two transmission plugs 140, 142. The two transmission plugs 140, 142 are disposed at a surface of the rigid component 14, respectively, and a transmission circuit (not shown) is embedded in the rigid component 14. The two transmission plugs 140, 142 are coupled with two terminals of the transmission circuit, respectively. In the embodiment, the rigid component 14 is substantially C-shaped or may be U-shaped. The transmission circuit can be a universal serial bus transmission line. However, the invention is not limited thereto.

When a user want to fasten the expansion device 12 to the computer 10, the first holding portion 120 of the expansion device 12 is plugged into the second holding portion 104 of the computer 10, and the two transmission plugs 140, 142 of the rigid component 14 are detachably connected with the first interface socket 122 at the second side of the expansion device 12 and the second interface socket 106 of the computer 10, respectively, thus to fasten the expansion device 12 to the computer 10.

At the same time, the rigid component 14 can clip and fasten the expansion device 12, and the transmission circuit in the rigid component 14 can also be used as a channel for supplying power and exchanging information between the expansion device 12 and the computer 10.

In other words, the expansion device 12 forms two-point fastening combination with the extending portion 102 and the main body portion 100 of the computer 10 via the holding assembly (the first holding portion 120 and the second holding portion 104) and the rigid component 14, and the internal surfaces of the expansion device 12 and the main body portion 100 can be attached to each other to allow the expansion device 12 to be capable of being fastened to the computer 10 (as shown in FIG. 1A and FIG. 1B).

In addition, when the expansion device 12 is fastened to the computer 10, the user can further operate the latching switch 109 of the computer 10, and the latching switch 109 is interlocked with the second latching portion 108 of the computer 10 to allow the second latching portion 108 of the computer 10 and the first latching portion 124 of the expansion device 12 to be fastened to each other, thereby allowing the internal surfaces of the expansion device 12 and the main body portion 100 to be tightly attached to each other (as shown in FIG. 1A and FIG. 1B). The second latching portion 108 of the computer 10 and the first latching portion 124 of the expansion device 12 are the latching assembly in the embodiment of the invention. The expansion device 12 and the computer 10 can form a combination relation with three fastening points via cooperation of the latching assembly. In another embodiment, an elastic component may be further disposed at the latching switch 109 and the second latching portion 108, and the latching relation between the computer 10 and the expansion device 12 may be automatically formed via the elasticity.

According to the abovementioned, the expansion device 12 includes three fastening points (the first holding portion 120, the first interface socket 122, and the first latching portion 124), and the three fastening points are located three side surfaces of the expansion device 12, respectively, to allow the three sides of the expansion device 12 to be fastened to the computer 10, thereby improving stability of fastening relation between the expansion device 12 and the computer 10.

On the other hand, when the user wants to release the fastening relation between the computer 10 and the expansion device 12 to replace expansion device 12 with a different one or to independently use the computer 10 and the expansion device 12, the user can pull out of the rigid component 14, and the user can operate the latching switch 109 to release the two second latching portions 108 and the first latching portions 124. Finally, the user can separate the first holding portion 120 of the expansion device 12 from the second holding portion 104 of the computer 10.

In addition, a casing of the main body portion 100 further has a power button 110 (as shown in FIG. 1A). The power button 110 can be disposed at a corner of the casing of the main body portion 100, and the power button 110c can be integrated with the casing of the main body portion 100 to form a flat surface.

On the other hand, the expandable computer system 1 can be conveniently hanged at different places for use (such as at a back plate of a liquid crystal television). To facilitate operation of the users, the computer 10 further includes an expansion socket 111 (as shown in FIG. 2A) for being coupled with a wiring control switch (not shown). In one embodiment, the wiring control switch can include a switch and extending transmission lines with different lengths, and it can be used as an extended power switch of the computer 10. The user can operate the wiring control switch to control a power switch state of the computer 10. In addition, the power switch is just an example, and the expansion socket 111 can also be coupled with extending transmission lines with other functions. The invention is not limited thereto.

For example, if the expandable computer system 1 is hanged at a back plate of a liquid crystal television, the user may allow the wiring control switch and the expansion socket 111 of the computer 10 to be connected with each other, and the switch button may turn around the liquid crystal television to move to the front of the liquid crystal television or a place facilitating operation via the wiring control switch. Thus, the user can conveniently start the computer 10 without stretching hands to press the power button of the computer 10.

To sum up, according to the expandable computer system in the embodiment of the invention, different kinds of expansion devices (such as a storage media with large capacity, an optical disk recorder, a blue-ray disk drive, a high definition Bluetooth image player and so on) can be conveniently fastened to the computer. The rigid component can be used for clipping and fastening the expansion device, and it can also be used as a channel for supplying power or exchanging information between the expansion device and the computer, thereby allowing the expandable computer system to use the expansion device to achieve different advanced applications.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An expandable computer system comprising:
    an expansion device including a first holding portion and a first interface socket, the first holding portion disposed at a first side of the expansion device, the first interface socket disposed at a second side of the expansion device;
    a computer including a second holding portion and a second interface socket; and
    a rigid component having two transmission plugs, a transmission circuit embedded in the rigid component, the two transmission plugs coupled with two terminals of the transmission circuit, respectively;

wherein the two transmission plugs of the rigid component is detachably connected with the first interface socket of the expansion device and the second interface socket of the computer, respectively while the first holding portion is connected with the second holding portion.

2. The expandable computer system according to claim 1, wherein the computer further comprises:
a main body portion; and
an extending portion extending and bent from one end of the main body portion to present an L-shaped structure with the main body portion, the second holding portion being disposed at the extending portion, the second interface socket being disposed at the main body portion.

3. The expandable computer system according to claim 2, wherein the expansion device is fastened to the extending portion of the computer via the first holding portion at the first side, and a surface of the expansion device is attached to a surface of the main body portion while the first holding portion is connected with the second holding portion, and the two transmission plugs of the rigid component are connected with the first interface socket and the second interface socket, respectively.

4. The expandable computer system according to claim 3, wherein the expansion device further comprises a first latching portion disposed at a third side of the expansion device, the main body portion comprises a second latching portion corresponding to the first latching portion, the second latching portion and the first latching portion are fastened to each other to allow the surface of the expansion device to be tightly attached to the surface of the main body portion.

5. The expandable computer system according to claim 4, wherein the main body portion comprises a latching switch interlocked with the second latching portion to allow the second latching portion and the first latching portion to be fastened to or released from each other.

6. The expandable computer system according to claim 2, wherein the extending portion comprises a balancing weight element for balancing weight distribution between the main body portion and the extending portion.

7. The expandable computer system according to claim 1, wherein the expansion device is a portable hard disk, a portable optical disk drive, a multimedia player, or a wireless multimedia player.

8. The expandable computer system according to claim 1, wherein the computer supplies power for the expansion device via the transmission circuit in the rigid component, and the computer exchanges information with the expansion device via the transmission circuit.

9. The expandable computer system according to claim 1, wherein the first interface socket and the second interface socket are a universal serial bus (USB) socket, respectively, and the transmission circuit embedded in the rigid component is a USB transmission line.

10. The expandable computer system according to claim 1, wherein the first holding portion is a protrudent block, the second holding portion is a recess, and the protrudent block is inserted into the recess to allow the expansion device to be fastened to the computer.

11. The expandable computer system according to claim 1, wherein the first holding portion and a casing of the expansion device are integrally formed.

12. The expandable computer system according to claim 1, wherein the first holding portion is detachably disposed at a casing of the expansion device.

13. The expandable computer system according to claim 1, wherein the computer further comprises a power button disposed at a corner of a casing of the computer, the power button and the casing are integrated to form a flat surface.

14. The expandable computer system according to claim 1, wherein the computer further comprises an expansion socket coupled with a wiring control switch.

15. A fastening device for fastening an expansion device to a computer, the fastening device comprising:
a holding assembly including:
a first holding portion disposed at a first side of the expansion device; and
a second holding portion disposed at the computer; and
a rigid component having two transmission plugs, a transmission circuit embedded in the rigid component, the two transmission plugs coupled with two terminals of the transmission circuit, respectively;
wherein the two transmission plugs of the rigid component are detachably connected with a first interface socket at a second side of the expansion device and a second interface socket of the computer, respectively while the first holding portion is connected with the second holding portion.

16. The fastening device according to claim 15, wherein the transmission circuit of the rigid component is used as a channel for supplying power and exchanging information between the computer and the expansion device.

17. The fastening device according to claim 15, wherein the transmission circuit embedded in the rigid component is a USB transmission line.

18. The fastening device according to claim 15, wherein the first holding portion is a protrudent block, the second holding portion is a recess, and the protrudent block is inserted into the recess to allow the expansion device to be fastened to the computer.

19. The fastening device according to claim 15, wherein the first holding portion and a casing of the expansion device are integrally formed.

20. The fastening device according to claim 15, wherein the first holding portion is detachably disposed at a casing of the expansion device.

21. The fastening device according to claim 15, further comprising a latching assembly, the latching assembly including a first latching portion and a second latching portion, wherein the first latching portion is disposed at a third side of the expansion device, the second latching portion is disposed at the computer, and the second latching portion and the first latching portion are fastened to each other to allow a surface of the expansion device to be tightly attached to a surface of the computer.

* * * * *